May 30, 1933. G. E. KARL 1,911,623
ROTARY HOE
Filed Feb. 10, 1930 2 Sheets-Sheet 1

George E. Karl, Inventor

By Slough & Canfield

His Attorneys

May 30, 1933.  G. E. KARL  1,911,623
ROTARY HOE
Filed Feb. 10, 1930  2 Sheets-Sheet 2
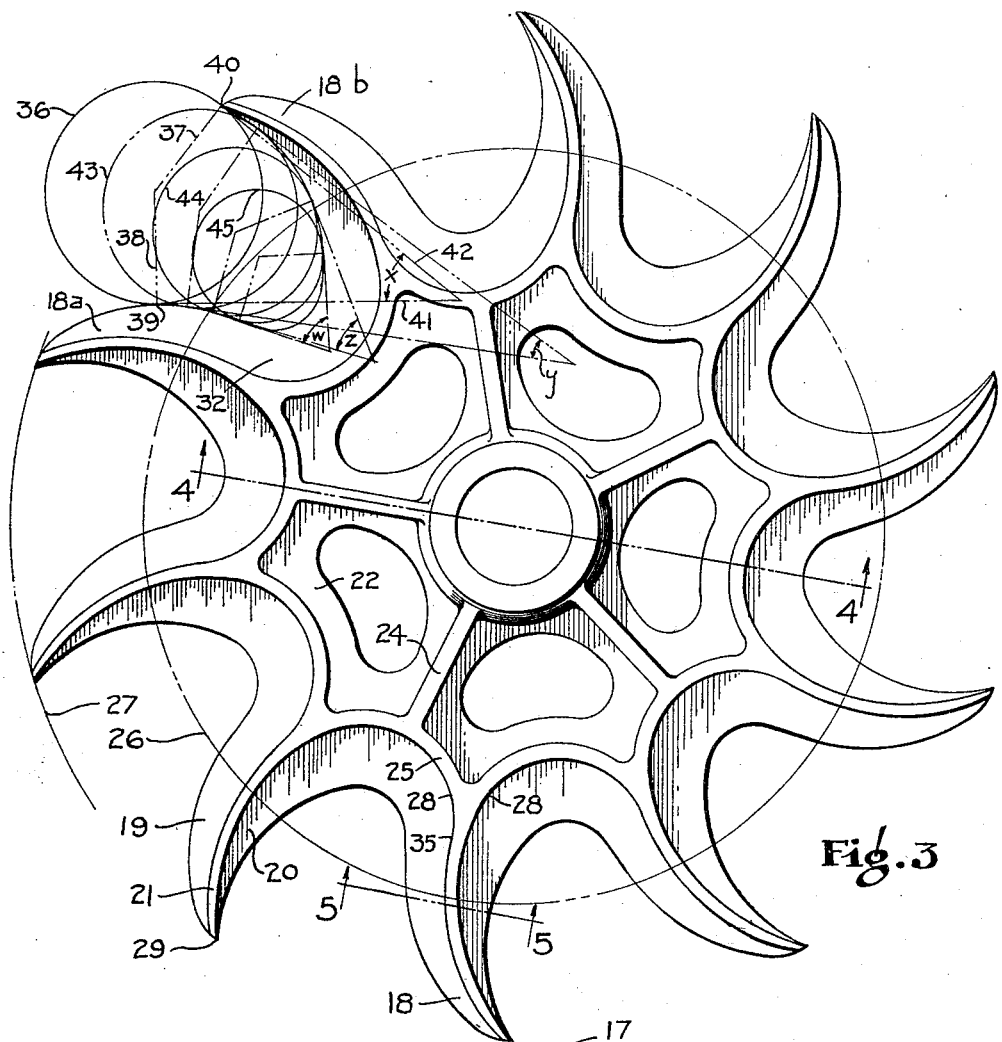
Fig. 3
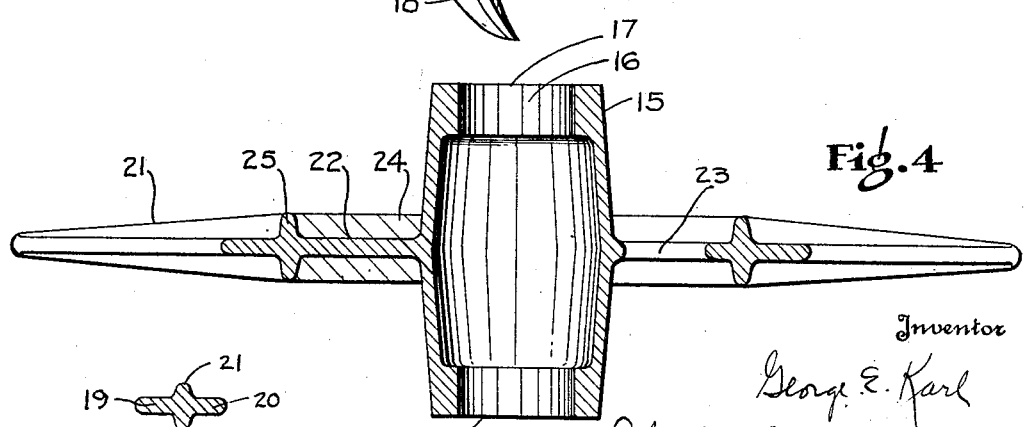
Fig. 4
Fig. 5
Inventor
George E. Karl
By Slough & Canfield
His Attorneys.

Patented May 30, 1933

1,911,623

UNITED STATES PATENT OFFICE

GEORGE E. KARL, OF BEREA, OHIO, ASSIGNOR, BY MESNE ASSIGNMENTS, TO THE DUNHAM COMPANY, OF BEREA, OHIO, A CORPORATION OF OHIO

ROTARY HOE

Application filed February 10, 1930. Serial No. 427,297.

This invention relates to agricultural implements for tilling and cultivating the soil and particularly to implements of the class known as rotary hoes.

Rotary hoes comprise usually a plurality or gang of wheels mounted to rotate on a common axis and provided each with peripheral teeth and adapted to be propelled or rolled on the ground, the teeth penetrating the surface of the ground to till or cultivate the same.

One of the difficulties heretofore encountered with rotary hoes has been that the teeth of the wheels thereof, if made slender and sharp enough to penetrate hard soil, are easily broken on stony ground or when the implement is rolled over a pavement or hard road in transporting it from place to place.

Another objection to prior rotary hoes has been that in stony ground stones become tightly wedged between adjacent teeth of the wheels and are picked up and carried along with the implement and interfere with its operation.

Another objection to prior rotary hoes has been that the penetration of the teeth into the soil is accompanied by a concurrent horizontal thrust of the teeth on the soil. This often causes the teeth to break, particularly in hard or stony ground. It also opposes the penetration of the teeth into the ground and requires that the implement be excessively heavy or that it be correspondingly weighted to effect the necessary penetration, and therefore, as a further consequence, increases the draft necessary to propel the implement. In prior rotary hoes it has been attempted to correct this defect by employing toothed wheels of relatively large diameter and provided each with a relatively great number of teeth, and this remedy not only does little toward solving the difficulty but adds to the weight and cost of the implement.

It is one of the objects of this invention to provide a rotary hoe having toothed wheels of improved form adapted to till and cultivate the soil in an improved manner.

Another object is to provide an implement of the class described, the toothed wheels or individual rotary hoes of which may be maintained in the soil to the desired depth with the minimum of weight and which will require relatively light draft to propel the same.

Another object is to provide such an implement in which the teeth of the wheels will not readily pick up stones or the like.

Another object is to provide in an implement of the class described, a toothed wheel having teeth so formed that each tooth upon rolling into engagement with the soil will penetrate it easily and with substantially no concurrent horizontal component of movement in the soil.

Another object is to provide in an implement of the class described an improved rotary toothed wheel which will operate efficiently and with relatively small draft when made of relatively small diameter and few teeth.

Another object is to provide in an implement of the class described, a rotary toothed wheel the teeth of which are so formed that as they successively emerge from the soil they will exert the maximum of hoeing effect thereon, and will operate upon the soil with the maximum of efficiency.

Other objects will be apparent to those skilled in the art to which my invention pertains.

My invention is fully disclosed in the following description taken in connection with the accompanying drawings, in which:—

Fig. 3 is a side elevational view of one of the individual toothed wheels or rotary hoes of the implement of Figs. 1 and 2;

Figure 6:
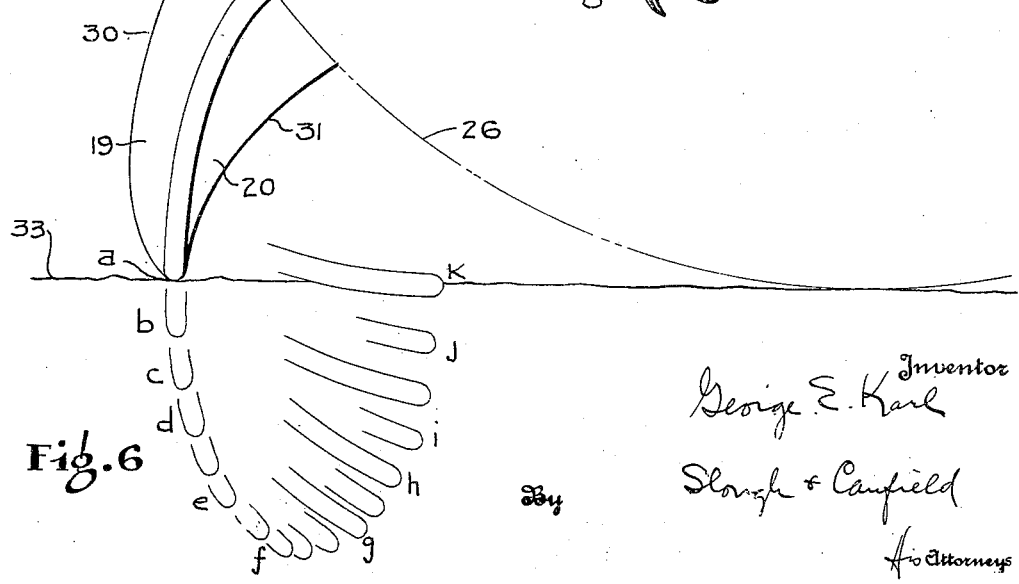

Figs. 4 and 5 are cross-sectional views of the toothed wheel of Fig. 3 taken respectively from the planes 4 and 5 thereof;

Fig. 6 is a diagrammatic view illustrating the action of a toothed wheel which I may employ as it penetrates the soil, and as it emerges from the soil.

Referring to the drawings, I have shown a main frame comprising a pair of spaced transversely disposed horizontal bars 1 and 2 connected together at their ends by side brackets 3—3, only one of which is shown.

Rigidly secured to the frame and extending forwardly thereof is a tongue 4 supported at its forward end on a swivelling wheeled truck, indicated generally at 5 and provided with a coupling or hitch 6 by which the implement may be connected to a source of motive power such as a tractor.

The brackets 3 are provided at points below the bars 1 and 2 with a pivot bearing on which is pivotally mounted as at 7 a rocking head 8 extending forwardly and rearwardly of the implement and in its forward and rearward ends provided with shaft bearing housings 9 and 10. Supported in the bearing housings 9 and 10 are the ends of a pair of transverse shafts 11 and 12 extending transversely of the implement and upon each of which is rotatably mounted a plurality or gang of toothed wheels or individual wheel hoes 13—13.

The toothed wheels 13, to be more fully described, are adapted to rest upon the soil and support the implement proper. When tractive power is applied to the hitch 6 to pull it forwardly, the toothed wheels 13 will roll upon the soil and the teeth thereof penetrate it to a suitable depth and work or till or cultivate the same in a manner well understood as characteristic of rotary hoes. To add to the weight of the implement to cause the teeth of the wheels to penetrate the soil, weights carried in suitable weight pans, not shown, or attached in any suitable manner to the frame 1—2—3 may be employed. A seat 14 secured to and supported on the frame preferably by a resilient standard 15 may be provided for the operator and his weight utilized to help hold the teeth in the soil.

By providing the pivot bearing 7, the rocking heads 8 and the two gangs of toothed wheels supported at the ends of the head at forward and rearward sides of the bearing may rock on the bearings 7 to cause the toothed wheels of both gangs to adjust themselves to irregularities of the surface of the soil. Preferably, the bearing 7 is disposed nearer to the forward gang than to the rearward gang, as clearly shown in the drawings, the preferred ratio being approximately 1 to 2.

The toothed wheels 13 are preferably all alike and embody certain important features of my invention and will now be described. The wheel comprises generally a hub portion 15 having a bore 16 by which the wheel may rotate on the shaft 12 on which it is mounted and having also end faces 17—17 by which the several toothed wheels are maintained in spaced relation with each other.

Extending generally radially from the hub is a plurality, such as ten teeth 18. Each of the teeth 18 comprises a forwardly extending blade 19 and a rearwardly extending blade 20 and a transversely disposed hoeing blade 21. The blades 19, 20 and 21 are joined to or connected to the hub 15 by a web 22 disposed in the rotational plane of the wheel, which if desired to control the weight of the individual hoes or toothed wheels may be lightened by being perforated as at 23 by perforations symmetrically disposed around the axis of the hub, and the web 22 may be strengthened by transverse radial ribs 24 disposed between the perforations 23 and joined to the hub 15. The hoeing blades 21 of each pair of adjacent teeth 18 are connected together or merge into each other to form a maximum depth flange 25, and the ribs 24 are preferably extended radially from the hub 15 and join the flanges 25. By this construction, it will be seen that the wheel comprises generally a planular portion in the plane of rotation of the wheel composed of the blades 19 and 20 and web 22, and ribs or transverse flanges thereon composed of the hoeing blades 21, depth flanges 25 and ribs 24.

As will presently appear, the blades 19, 20 and 21 and the flanges 25 in the wheel of my invention are formed in a particular manner or to a particular configuration, whereas the web 22, perforations 23, ribs 24, etc., may be variously formed and relatively disposed or, if desired, may be entirely omitted, that is, for example, that portion of the wheel outside of the hub and inside of the flanges 25 may be solid and of uniform thickness.

Preferably the wheel thus constructed is produced or manufactured by casting it in a single piece from suitable material, such as cast iron, but obviously it may be constructed by other methods. As will now be clear, those portions of the wheel which engage and penetrate and work the soil are the teeth 18 comprising the forward blade 19, rearward blade 20, hoeing blade 21 and maximum depth flange 25. When the wheel is rolled along the soil, the blades 19, 20 and 21 cut it with a slicing action during the penetration, and as the tooth emerges from the soil, the hoeing blade 21 exerts thereon a hoeing action, to be referred to later.

The preferred form of the teeth 18 to cause them to operate in accordance with my invention may be arrived at in various ways, but I prefer to proceed as follows: Having in mind, generally, the character of work to be performed by the implement and particularly by the individual toothed wheels or rotary hoes thereof, I determine the average depth at which it is desired that the teeth 18 shall penetrate the soil. The toothed wheel is then considered as if it were to roll on a circle tangent to the surface of the soil with the teeth penetrated to said average depth. In the drawings, the circle 26 represents such a circle, and the said average depth is represented by the radial distance between the circle 26 and a circle 27 determining the length of the teeth or bounding the points thereof.

The hoeing blades 21 in that portion thereof outside of the circle 26 are shaped to conform to involute curves of which the circle 26 is the evolute or base circle, the hoeing blades extending from the circle 26 to the circle 27. The maximum depth flange 25 is then positioned inside of the circle 26 at a radial distance therefrom approximately the same as the radial distance between the circles 26 and 27 and the flange 25 is curved concavely outwardly and joined to or merged into inwardly radially disposed continuations 28 of the two adjacent hoeing blades 21. Thus, the hoeing blades 21 inside of the base circle 26 continue first radially as extensions or continuations 28 and then curve laterally and form the maximum depth flange 25.

The forward blade 19 and rearward blade 20 are then formed to provide cutting or slicing edges 30 and 31 respectively. These edges curve generally in the same direction as the blades 21, that is, the edge 31 being concave and the edge 30 being convex and these curves are so determined that the width of the tooth from the edge 30 to the edge 31 when measured at right angles to the blade 21 at any point thereof continually increases from the point 29 of the tooth inwardly. Furthermore, the curvature of the edge 31 of one tooth, such as the tooth 18—a is determined with respect to the curvature of the opposite edge 30 of the next adjacent tooth, such as the tooth 18—b, so that the space between the confronting edges 31 and 30 have the following property, because of which stones or the like engaged by the edges 30 and 31 will not become wedged in the said space and picked up and carried along with the wheel.

As will be observed, the space between the edges 30 and 31 is generally of wedge shape, that is it is wide near the outer extremities of the teeth and becomes narrower inwardly toward the center. The confronting edges 30 and 31 therefore are generally inclined inwardly toward each other. To pick up a stone, the stone must be small enough to enter in this space and must be wedgingly engaged on opposite sides by the edges 30 and 31.

I have discovered that in prior rotary hoes, stones or the like may be wedgingly engaged between adjacent teeth for several reasons, among which are that the teeth must be spaced closely together, as hereinbefore referred to, and include therebetween, as a consequence, a sharp angle; and that the teeth are relatively long and slender, as hereinbefore referred to, in order to penetrate the soil, and therefore are resilient; and because of the shape of the teeth and their tendency to break, they are made of relatively soft material, such as malleable iron, to avoid brittleness. Thus, in these prior hoes, when a rock, stone or the like is forced into the space between adjacent teeth, it enters a small-angled wedge-shaped space and springs the teeth slightly apart and the teeth, due to their relatively soft surfaces, seize or grippingly engage the stone and securely hold it.

In the wheel of my invention, however, the adjacent teeth may be relatively short and in the circumferential direction are at all points relatively thick in section, which renders them non-resilient; and because of the strength of the teeth when thus shaped, the wheel and the teeth thereon may be made from relatively hard and brittle material, such for example as cast iron, without danger of breaking the teeth which may thus provide on the confronting edges 30 and 31 relatively hard surfaces. Thus, two of the main difficulties in prior wheels, which cause them to pick up stones are obviated.

As to the angle between adjacent teeth, this, in the wheel of my invention, is determined by the form or configuration of the edges 30 and 31, and as will now be shown, is not only made so great adjacent the points of the teeth as not to pick up a large stone, but becomes greater and greater inwardly radially, and therefore will not pick up smaller stones which might enter the space between the teeth.

As will be understood, the holding or gripping force exerted on a stone to hold it wedged between the two teeth is in the direction normal to the surface. Referring to Fig. 3, I have indicated by the circle 36 the largest possible stone which may be placed in the space between the confronting edges 30 and 31. Radial lines 37 and 38 drawn to the points of contact 39 and 40 of the circle 36 with the edges 30 and 31 represent the direction of the wedging forces exerted on the stone and lines 41 and 42 drawn at right angles to the lines 37 and 38 will be tangent to the edges 30 and 31 at the points of contact 39 and 40, and the angle $x$ between the lines 41 and 42 is the angle of inclination of the edges 30 and 31 at the points 39 and 40 where they contact with the circle or stone 36. In the design of the wheel, the edges 30 and 31 are shaped so that the angle $x$ will be great enough to prevent the stone from being gripped and retained between the edges 30 and 31, that is a minimum non-gripping angle $x$ is provided between the confronting edges 30 and 31 at the points of the teeth, or at the entrance to the space between the teeth.

Smaller stones will pass farther into the space between the teeth and such stones are diagrammatically illustrated by the circles 43, 44, 45 etc., and the wedge angle between the edges 30 and 31 at points upon which such stones engage them are indicated as in the case of the circle 36 by the angles $y$, $z$ and $w$, and as will be seen, the said angle becomes successively greater.

In other words, by forming the teeth of the wheel and the edges 30 and 31 of the blades 20 and 21 according to my invention, if the angle of inclination between the adjacent confronting edges at the extremities of the teeth is selected to be too great to grip a stone taking into account the hardness of the surface of the material and the rigidity of the teeth, then at all points inward of the extremities of the teeth, there will be even less tendency to grip and pick up stones due to the above described property that the angle between the confronting surfaces of adjacent teeth becomes greater and greater.

By providing edges 30 and 31 having curvature of the above described property, the rearward blade of say the tooth 18—$a$ and the forward blade of the adjacent tooth 18—$b$ may be continued or merged into a blade portion 32 radially outwardly with respect to the depth flange 25.

Preferably, the hoeing blades 21 are made of increasing width inwardly from the point 29 in the direction at right angles to the blades 19 and 20, as shown in Fig. 5, reaching a maximum width at approximately the point 35 where the extensions 28 meet the corresponding two adjacent flanges 25.

In the operation of a wheel formed as above described, during penetration of a tooth into the soil as the wheel rolls along the surface of the soil approximately on the said base circle 26, the relatively thin or sharp blades 19 and 20 and the lateral edges of the blade 21 cut or slice their way into the soil and break up the same into small sections.

Continued rolling of the wheel will cause the blade 21 to be drawn upwardly out of the soil with a hoeing action pulverizing the broken sections of the soil. The action will be the same or similar whether the soil is hard and compacted or whether it has been loosened and somewhat broken up by a preceding operation.

It is one of the important features of my invention that during the penetration of the tooth into the soil, the hoeing blade 21 enters the soil with a true slicing or cutting action and with substantially no horizontal component of movement forwardly or rearwardly. In prior rotary hoes, the tooth moves downwardly into the soil and concurrently horizontally in the soil with the attendant evils mentioned hereinbefore. This horizontal component of movement is prevented in the wheel of my invention by conformig the hoeing blade 21 to an involute curve and the action thereof in penetrating the soil is illustrated in Fig. 6.

At $a$ is indicated the relative position at which the hoeing blade 21 is presented to the surface 33 of the soil when the point of the blade is in contact with the surface. As the wheel rolls along the surface, the successive positions of the blade 21 as it penetrates the soil are indicated at $b$, $c$, $d$, etc. It will be observed that at the surface 33, because of the involute curvature of the blade 21, there is no horizontal component of movement of the blade 21 relative to the surface 33 and that the point 29 of the blade 21 penetrates almost to its full depth before any appreciable horizontal component of movement begins.

As the wheel continues to roll, the movement of the blade 21 changes from a purely penetrating movement to a lifting or hoeing movement and lifts or backwardly kicks the soil as the blade emerges from the ground at the position $k$.

The inwardly increasing cross-sectional dimensions of the teeth cause the wheel and the rotary hoe as a whole to penetrate only to a depth at which the weight of the hoe is balanced by the resistance to the penetration, and by adjusting the weight of the hoe, as above referred to, the wheels may be caused to run or float in the soil at the desired depth with the said base circle rolling on the surface of the soil.

In soils which are soft, or which have been broken or loosened by a preceding operation, the advantages of causing the teeth to penetrate the soil without the said horizontal component of movement are not so important and the wheels may be permitted to work at a greater depth. In any case, the maximum depth to which the wheels penetrate may be limited by the flanges 25—25.

By employing the principle of the involute in shaping the teeth as above described, the teeth will penetrate the soil without the objectionable horizontal thrust above referred to and therefore with the minimum of weight on the wheel. Furthermore, because of the involute shape of the teeth, they will penetrate the soil easily and without the horizontal component of movement, even if adjacent teeth are disposed at relatively great angle to each other, that is, if relatively few teeth are disposed around a wheel of relatively small diameter, and, as will be understood, a wheel of small diameter besides making possible a lighter and less cumbersome implement will more effectively hoe the soil as the teeth emerge from the ground. In wheels of large diameter there is a greater tendency for the teeth merely to be withdrawn from the soil in the same direction in which they penetrate it without pulverizing or otherwise working it.

Figure 1:
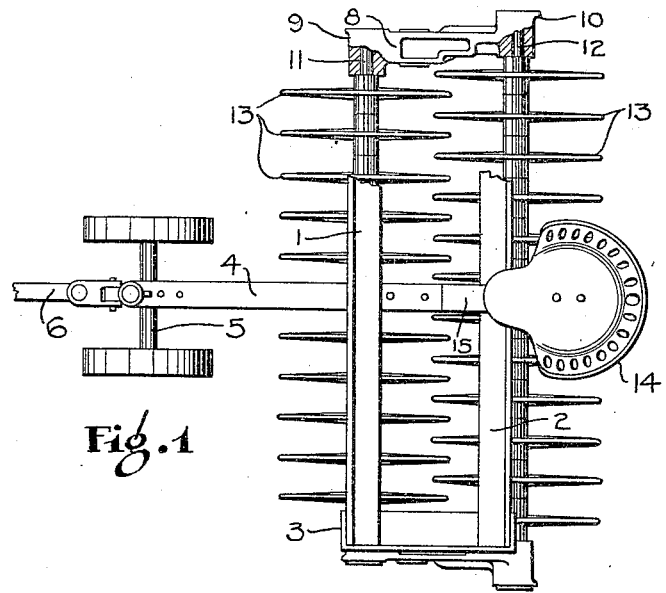
Fig. 1 is a top plan view of a rotary hoe embodying my invention.
Figure 2:
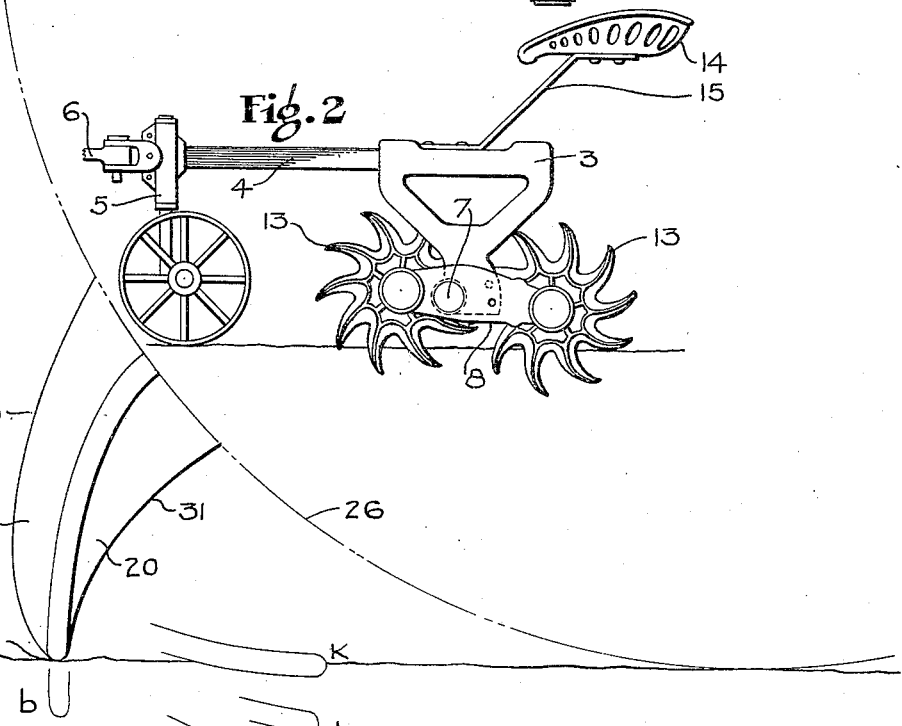
Fig. 2 is an end elevational view of the implement of Fig. 1.

Referring to Fig. 2, it will be observed that the rearward gang of wheels is illustrated as penetrating the soil to a greater depth than the forward gang. The gangs may in some cases take up these relative positions, but this is only one of the relative operating positions of the wheels. By pivoting the rocking head 8 at 7 on the frame, as above described, the gangs are free to take up, relatively, positions of different depth or to run at the same depth of penetration in accordance with soil conditions and with irregularities of the surface, and are thus enabled to work the ground more thoroughly and uniformly than if the gangs were rigidly connected to the frame, and the rocking of the head 8 on the frame facilitates the penetrating or floating of the wheels at the desired depth on irregular soil surfaces, and therefore facilitates the desired and above described action of the involute shaped portions of the wheel teeth.

My invention is not limited to the exact details of construction shown and described. Many changes may be made therein without departing from the spirit of my invention or sacrificing its advantages.

I claim:

1. A multi-toothed wheel for rotary hoes, the teeth of which are provided each with a soil working blade conforming substantially to an involute curve developed from a circle of the wheel on which the wheel rolls on the surface of the soil, and provided with a soil cutting blade, the plane of which intersects the soil working blade and part of which is forward of and part rearward of the soil working blade.

2. A multi-toothed wheel for rotary hoes, the teeth of which are cruciform on sectional planes parallel to the wheel axis and comprise each a soil working blade conforming substantially to an involute curve developed from a circle of the wheel on which the wheel substantially rolls on the surface of the soil, the width of the blade being disposed transversely to the direction of rolling of the wheel, and comprise each a soil cutting blade the width of which is disposed in the direction of the rolling movement of the wheel.

3. A multi-toothed wheel for rotary hoes, the teeth of which are cruciform on sectional planes parallel to the wheel axis and comprise each a soil working blade conforming substantially to an involute curve developed from a circle of the wheel on which the wheel substantially rolls on the surface of the soil, the width of the blade being disposed transversely to the direction of rolling of the wheel and comprise each a soil cutting blade the width of which is disposed in the direction of the rolling movement of the wheel, and the soil cutting blade being of increasing width inwardly from the extreme end of the tooth.

4. A multi-toothed wheel for rotary hoes, the teeth of which are cruciform on sectional planes parallel to the wheel axis and comprise each a soil working blade conforming substantially to an involute curve developed from a circle of the wheel on which the wheel substantially rolls on the surface of the soil, the width of the blade being disposed transversely to the direction of rolling of the wheel and comprise each a soil cutting blade the width of which is disposed in the direction of the rolling movement of the wheel, and the said blades being of increasing width inwardly from the extreme end of the tooth.

5. A multi-toothed wheel for rotary hoes, the teeth of which are provided each with a soil working blade conforming substantially to an involute curve developed from a circle of the wheel on which the wheel usually rolls on the surface of the soil, and having each two blade portions one disposed forwardly and one disposed rearwardly of the involute curve.

6. A multi-toothed wheel for rotary hoes, the teeth of which are provided each with a soil working blade disposed generally transversely of rotational planes of the wheel, and provided with a soil cutting blade, the plane of which intersects the soil working blade and a part of which is forward of and part rearward of the soil working blade.

7. A multi-toothed wheel for rotary hoes, the teeth of which are provided each with a soil working blade disposed generally transversely of rotational planes of the wheel, and provided with a soil cutting blade a part of which is forward of and part rearward of the soil working blade.

8. A multi-toothed wheel for rotary hoes, the teeth of which are provided each with a soil working blade disposed generally transversely of rotational planes of the wheel, and provided with a soil cutting blade, the plane of which intersects the soil working blade and a part of which is forward of and part rearward of the soil working blade, and the confronting surfaces of adjacent teeth being so formed that the angle embraced therebetween increases inwardly from the extreme outer ends of the teeth.

9. A multi-toothed wheel for rotary hoes, the teeth of which are provided each with a soil working blade disposed generally transversely of rotational planes of the wheel, and provided with a soil cutting blade a part of which is forward of and part rearward of the soil working blade, and the confronting surfaces of adjacent teeth being so formed that the angle embraced therebetween increases inwardly from the extreme outer ends of the teeth.

In testimony whereof I hereunto affix my signature this 27th day of January, 1930.

GEORGE E. KARL.